US012388939B2

(12) United States Patent
Shiraishi

(10) Patent No.: US 12,388,939 B2
(45) Date of Patent: Aug. 12, 2025

(54) LENS MIRROR ARRAY, OPTICAL DEVICE, AND IMAGE FORMING APPARATUS

(71) Applicant: TOSHIBA TEC KABUSHIKI KAISHA, Tokyo (JP)

(72) Inventor: Takashi Shiraishi, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 293 days.

(21) Appl. No.: 17/901,909

(22) Filed: Sep. 2, 2022

(65) Prior Publication Data

US 2024/0080401 A1    Mar. 7, 2024

(51) Int. Cl.
H04N 1/03       (2006.01)
G02B 3/00       (2006.01)
G02B 17/00      (2006.01)
G02B 17/08      (2006.01)
H04N 1/031      (2006.01)

(52) U.S. Cl.
CPC ......... H04N 1/0306 (2013.01); G02B 3/0075 (2013.01); G02B 17/002 (2013.01); G02B 17/086 (2013.01); H04N 1/0318 (2013.01)

(58) Field of Classification Search
CPC .............................. G02B 17/002; G02B 17/086
See application file for complete search history.

(56) References Cited

U.S. PATENT DOCUMENTS

| 10,649,359 | B2 * | 5/2020 | Shiraishi | ............... G02B 3/0006 |
| 2014/0204430 | A1 * | 7/2014 | Shiraishi | ............ H04N 1/02825 358/474 |
| 2021/0271185 | A1 | 9/2021 | Shiraishi | |

FOREIGN PATENT DOCUMENTS

| JP | 2015-52708 | | 3/2015 |
| JP | 2015052708 A | * | 3/2015 |
| JP | 2017-38401 | | 2/2017 |

* cited by examiner

Primary Examiner — Christopher Stanford
(74) Attorney, Agent, or Firm — Amin, Turocy & Watson, LLP

(57) ABSTRACT

An optical element of a lens mirror array according to an embodiment includes an incident-side lens surface, a first reflection surface, a second reflection surface, an emission-side lens surface, a first positioning surface, and a second positioning surface. The incident-side lens surface refracts and converges incident light. The first reflection surface reflects light made incident via the incident-side lens surface. The second reflection surface reflects the light reflected by the first reflection surface. The emission-side lens surface emits the light reflected by the second reflection surface. The lens mirror array is a lens mirror array in which a plurality of optical elements are arrayed in a direction orthogonal to optical axes of the incident light and the reflected light and parallel to the first positioning surface.

20 Claims, 7 Drawing Sheets

LENS MIRROR ARRAY, OPTICAL DEVICE, AND IMAGE FORMING APPARATUS

FIELD

Embodiments described herein relate generally to, for example, a lens mirror array, which is a component of a scanner, and an optical device and an image forming apparatus including the lens mirror array.

BACKGROUND

For example, a scanner of an image forming apparatus includes a lens mirror integrated array (hereinafter referred to as lens mirror array) for refracting and reflecting light reflected on a document surface and condensing the light on a CCD sensor or the like. The lens mirror array includes, for example, a plurality of optical elements arranged in a main scanning direction. The lens mirror array can be formed by, for example, integral molding of transparent resin.

In order to condense the reflected light reflected from the document surface on the CCD sensor, the lens mirror array needs to be accurately positioned on an optical path of the reflected light and attached. Accordingly, for example, a positioning surface of the lens mirror array is set in contact with a contact surface of a holder made of metal that can easily achieve surface accuracy and the lens mirror array is attached to the holder.

In recent years, it has been attempted to use a holder made of resin that can be more easily and inexpensively manufactured than the holder made of metal. However, a draft taper for a die needs to be provided in the holder made of resin. It may be difficult to provide, with large width in a draft direction for the die, a flat contact surface for positioning the lens mirror array.

DETAILED DESCRIPTION

Figure 1:
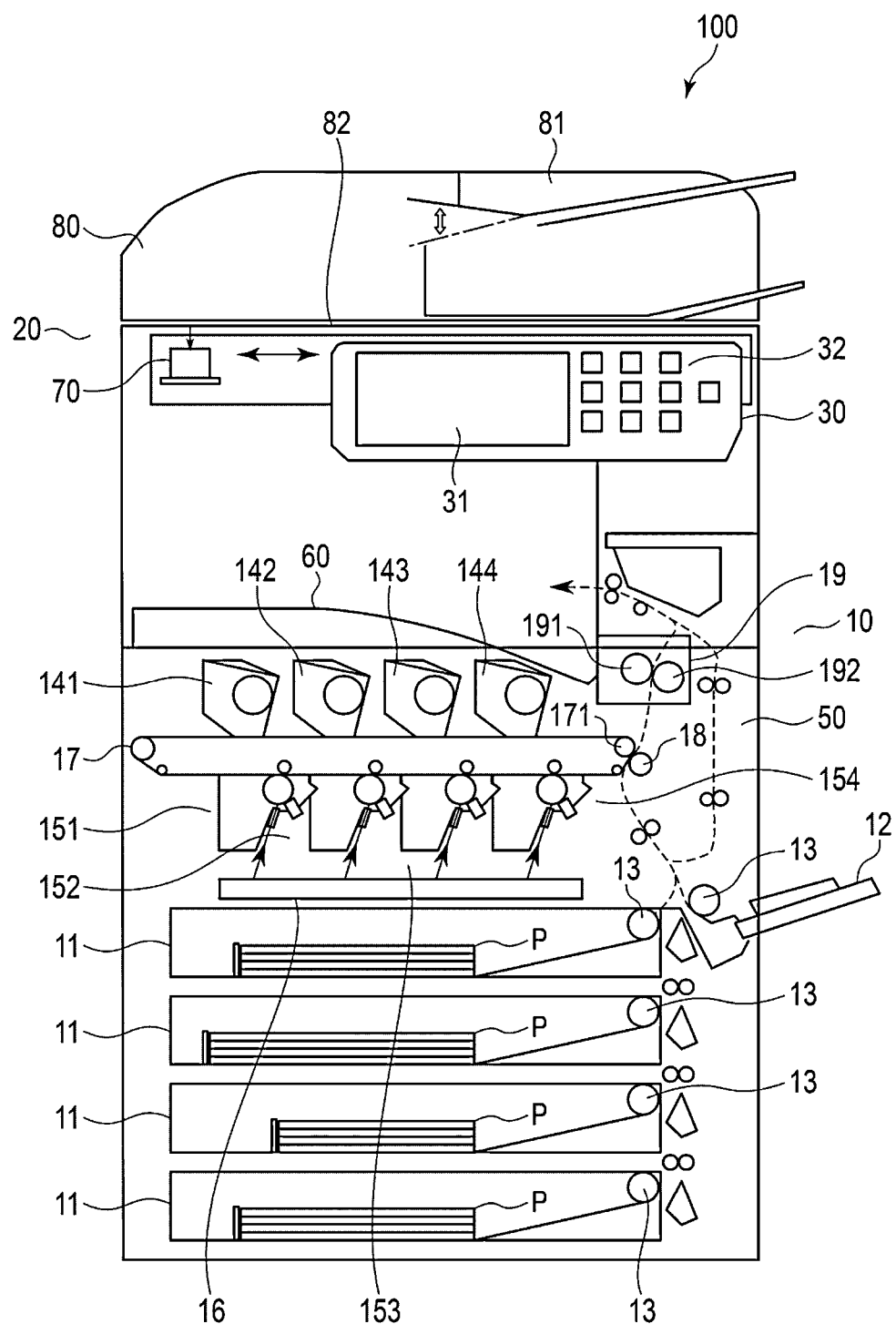
FIG. 1 is a schematic diagram illustrating an image forming apparatus according to an embodiment.

An optical element of a lens mirror array according to an embodiment includes an incident-side lens surface, a first reflection surface, a second reflection surface, an emission-side lens surface, a first positioning surface, and a second positioning surface. The incident-side lens surface refracts and converges incident light. The first reflection surface reflects light made incident via the incident-side lens surface. The second reflection surface reflects the light reflected by the first reflection surface. The emission-side lens surface emits the light reflected by the second reflection surface. The first positioning surface is a surface that is orthogonal to an imaginary center surface including an optical axis of the incident light and an optical axis of the reflected light reflected by the first reflection surface and is disposed in parallel to the optical axes in a position separated from the optical axes to a reflecting side of the light by the first reflection surface. The second positioning surface is present in a position that is further on the emission-side lens surface side than the first positioning surface along the optical axes and is further separated from the optical axes to the reflecting side of the light by the first reflection surface than the first positioning surface. The lens mirror array is a lens mirror array in which a plurality of optical elements are arrayed in a direction orthogonal to the optical axes and parallel to the first positioning surface.

An image forming apparatus according to an embodiment is explained below with reference to the drawings. In the drawings referred to in the following explanation of the embodiment, scales of units are sometimes changed as appropriate. In the drawings referred to the following explanation of the embodiment, components are sometimes omitted in order to clarify the explanation.

The image forming apparatus in this embodiment is an apparatus including a scan function such as an MFP (multifunction peripheral), a copying machine, or a facsimile placed in, for example, a workplace. An image forming apparatus 100 illustrated in FIG. 1 is an MFP.

The image forming apparatus 100 includes, for example, a printing function, a scan function, a copy function, a decoloring function, and a facsimile function. The printing function is a function of forming a toner image on paper P. The scan function is a function of reading an image from a document or the like on which the image is formed. The copy function is a function of printing, for example, the image read from the document using the scan function on the paper P using the printing function. The decoloring function is a function of decoloring an image formed by a decolorable developer on the paper P.

The image forming apparatus 100 includes a printer 10, a scanner 20, and an operation panel 30.

The printer 10 includes a plurality of paper feeding cassettes 11, a manual feed tray 12, and a plurality of paper feeding rollers 13. The paper feeding cassettes 11 store the paper P used for printing. The manual feed tray 12 is a tray for manually feeding the paper P. The paper feeding rollers 13 rotate to thereby selectively take out the paper P from the paper feeding cassettes 11 or the manual feed tray 12.

The printer 10 includes four toner cartridges 141, 142, 143, and 144, four image forming units 151, 152, 153, and 154, an optical scanning device 16, a transfer belt 17, a secondary transfer roller 18, and a fixing unit 19.

The toner cartridges 141 to 144 respectively store toners supplied to the image forming units 151 to 154. The toner cartridge 141 stores yellow (Y) toner. The toner cartridge 142 stores magenta (M) toner. The toner cartridge 143 stores cyan (C) toner. The toner cartridge 144 stores black (K) toner. A combination of the colors of the toners is not limited to YMCK and may be another combination. The toners may be toners that are decolored at temperature higher than a predetermined temperature.

The image forming units 151 to 154 respectively receive supply of the toners from the toner cartridges 141 to 144 and form toner images of different colors. The image forming unit 151 forms a yellow (Y) toner image. The image forming unit 152 forms a magenta (M) toner image. The image forming unit 153 forms a cyan (C) toner image. The image forming unit 154 forms a black (K) toner image.

Figure 2:
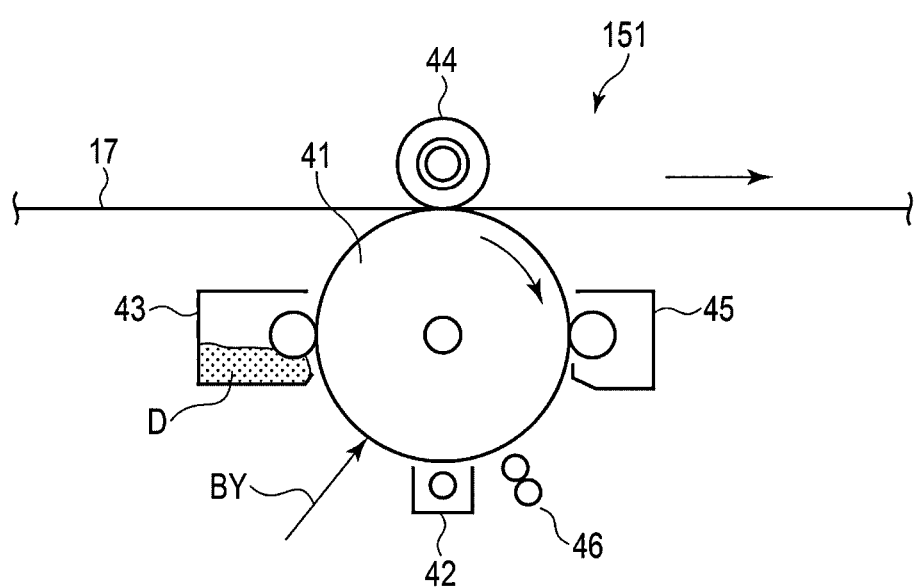
FIG. 2 is a schematic diagram illustrating an image forming unit of the image forming apparatus illustrated in FIG. 1.

The image forming units 151 to 154 have the same configuration except that the toners are different. Accordingly, the image forming unit 151 for yellow is representatively explained herein with reference to FIG. 2. Explanation of the image forming units 152 to 154 for the other colors is omitted.

The image forming unit 151 for yellow includes a photoconductive drum 41, a charging device 42, a developing device 43, a primary transfer roller 44, a cleaner 45, and a discharge lamp 46.

The photoconductive drum 41 includes a surface that receives a light beam BY irradiated from the optical scanning device 16. The optical scanning device 16 forms an electrostatic latent image on the surface of the photoconductive drum 41. The charging device 42 charges the surface of the photoconductive drum 41 with a positive charge. The developing device 43 develops the electrostatic latent image on the surface of the photoconductive drum 41 using yellow toner D supplied from the toner cartridge 141. That is, the developing device 43 forms a yellow toner image on the surface of the photoconductive drum 41.

The image forming unit 151 includes the primary transfer roller 44 in a position opposed to the photoconductive drum 41 across the transfer belt 17. The primary transfer roller 44 generates a transfer voltage between the primary transfer roller 44 and the photoconductive drum 41. Consequently, the primary transfer roller 44 transfers (primarily transfers) the toner image on the surface of the photoconductive drum 41 onto the surface of the transfer belt 17 that is in contact with the photoconductive drum 41.

The cleaner 45 removes the toner remaining on the surface of the photoconductive drum 41. The discharge lamp 46 removes electric charges remaining on the surface of the photoconductive drum 41.

The optical scanning device 16 irradiates, according to image data input thereto, the surfaces of the photoconductive drums 41 of the image forming units 151, 152, 153, and 154 respectively with light beams BY, BM, BC, and BK. The light beams BY, BM, BC, and BK are respectively based on image data of colors obtained by separating the image data into colors Y, M, C, and K. The optical scanning device 16 emits the light beam BY and forms an electrostatic latent image for yellow on the surface of the photoconductive drum 41 of the image forming unit 151 according to image data of a Y component. Similarly, the optical scanning device 16 emits the light beams BM, BC, and BK and forms electrostatic latent images for the colors on the surfaces of the photoconductive drums 41 of the image forming units 152, 153, and 154 according to image data of M, C, and K components.

The image data input to the optical scanning device 16 is, for example, image data read from a document or the like by the scanner 20. Alternatively, the image data input to the optical scanning device 16 is image data transmitted from an apparatus different from the image forming apparatus 100 to the image forming apparatus 100.

The transfer belt 17 is endlessly stretched. The transfer belt 17 rotates according to rotation of a driving roller 171 on which the transfer belt 17 is wound. The transfer belt 17 rotates to thereby carry the toner images of the colors formed to be superimposed on the surface of the transfer belt 17 by the image forming units 151 to 154 to a transfer region opposed to the secondary transfer roller 18.

The secondary transfer roller 18 is opposed to the driving roller 171 across the transfer belt 17. The secondary transfer roller 18 transfers (secondarily transfers) the toner image formed on the transfer belt 17 onto the paper P passing between the transfer belt 17 and the secondary transfer roller 18.

The fixing unit 19 heats and pressurizes the paper P. The fixing unit 19 includes a heating roller 191 and a pressurizing roller 192 opposed to each other across a conveying path for the paper P. The heating roller 191 includes a heat source such as a heater. The heating roller 191 heated by the heat source heats the paper P. The pressurizing roller 192 pressurizes the paper P passing between the pressurizing roller 192 and the heating roller 191. Accordingly, the fixing unit 19 fixes the toner image transferred on the paper P.

The printer 10 includes a duplex unit 50 and a paper discharge tray 60 besides the above. The duplex unit 50 enables the paper P to be printed on a rear surface. The duplex unit 50 switches back the paper P to thereby reverse the front and the rear of the paper P and sends the paper P into a transfer region between the transfer belt 17 and the secondary transfer roller 18. The paper discharge tray 60 is a tray for discharging the paper P on which printing is finished.

The scanner 20 reads an image from a document or the like. The scanner 20 includes a reading module 70 and a document feeding device 80. The reading module 70 is an embodiment of the optical device.

The reading module 70 irradiates a surface of a document (hereinafter referred to as document surface) including a reading target image with illumination light, receives reflected light of the illumination light with an image sensor 76 (FIG. 3), and converts the reflected light into a digital signal. Consequently, the reading module 70 reads the image from the document surface.

The document feeding device 80 is, for example, an ADF (auto document feeder). The document feeding device 80 conveys documents placed on a document tray 81 one after another through a document glass 82. The reading module 70 reads an image from a document conveyed to the document glass 82. The document feeding device 80 includes another reading module for reading an image from the rear surface of the document.

The operation panel 30 is a man-machine interface that performs input and output between the image forming apparatus 100 and an operator of the image forming apparatus 100. The operation panel 30 includes, for example, a touch panel 31 and an input device 32.

The touch panel 31 is, for example, a touch panel obtained by stacking a display such as a liquid crystal display or an organic EL display and a pointing device operated by touch input. The display of the touch panel 31 displays a screen for notifying various kinds of information to the operator of the image forming apparatus 100. The touch panel 31 receives touch operation by the operator.

The input device 32 receives operation by the operator of the image forming apparatus 100. The input device 32 is, for example, a keyboard, a keypad, or a touchpad.

Figure 3:
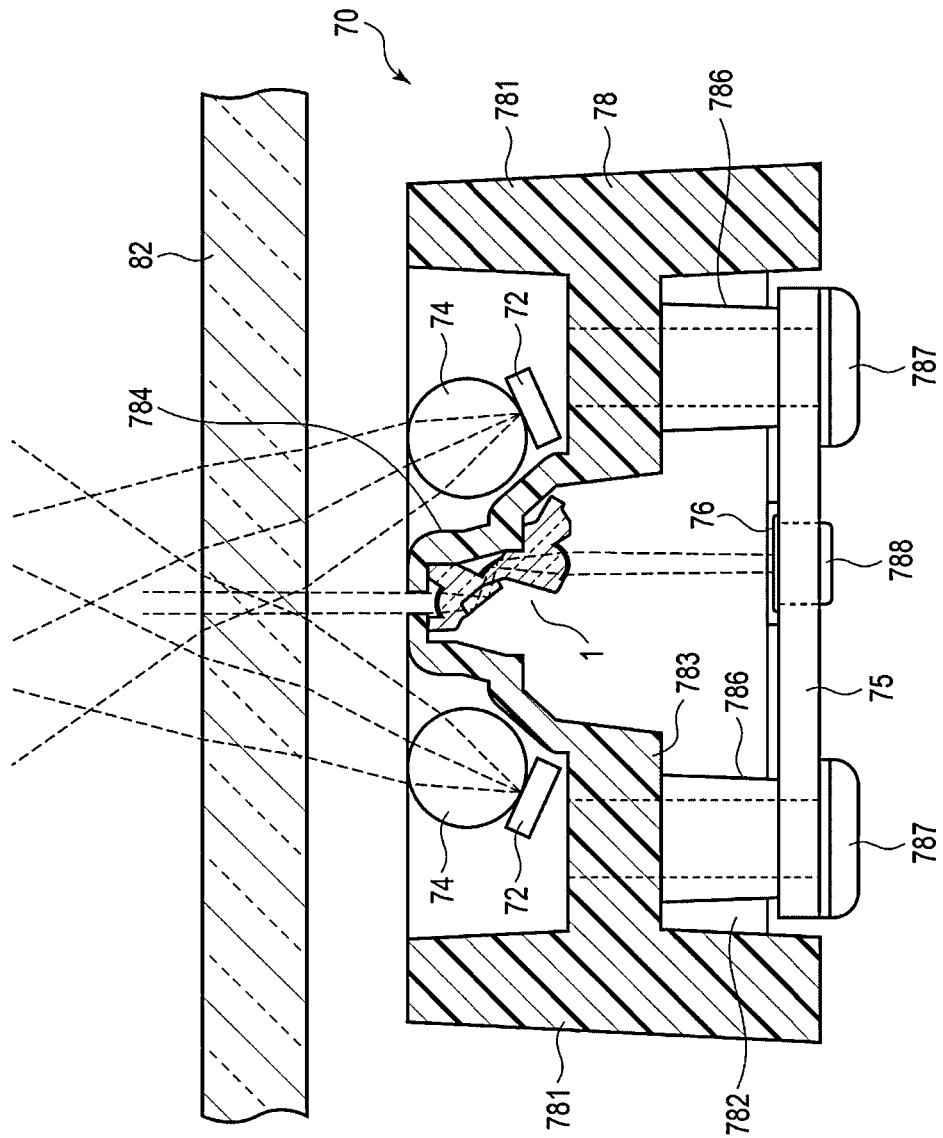
FIG. 3 is a sectional view illustrating an optical device of a scanner of the image forming apparatus illustrated in FIG. 1.

As illustrated in FIG. 3, the reading module 70 includes a lens mirror array 1, two reflection plates 72, two light guide bodies 74, an image sensor 76, and a holder 78. The holder 78 positions and holds the lens mirror array 1, the reflection plates 72, the light guide bodies 74, and the image sensor 76 (a substrate 75 on which the image sensor 76 is mounted).

Figure 4:
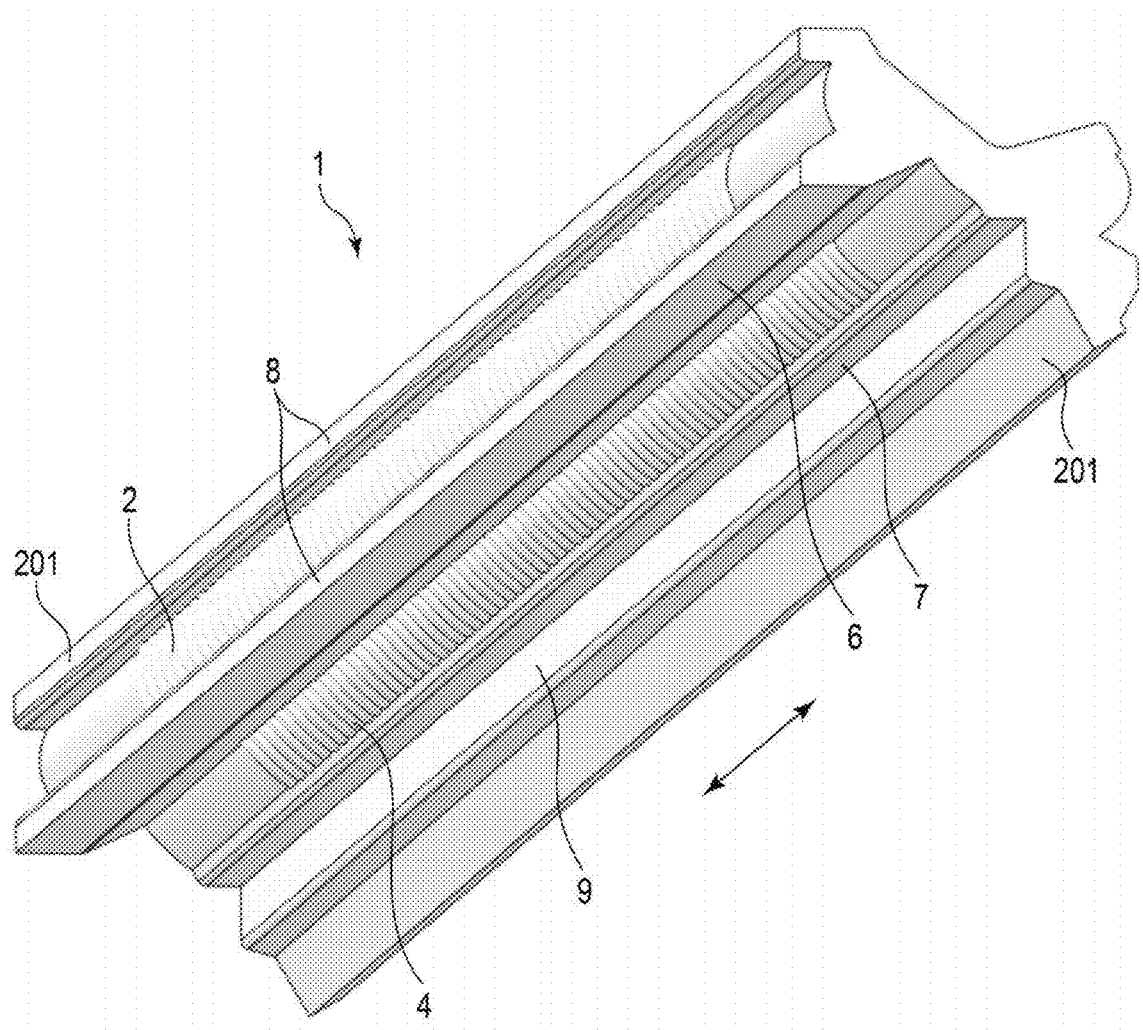
FIG. 4 is a perspective view of a lens mirror array of the optical device illustrated in FIG. 3 viewed from an incident side of light.
Figure 5:
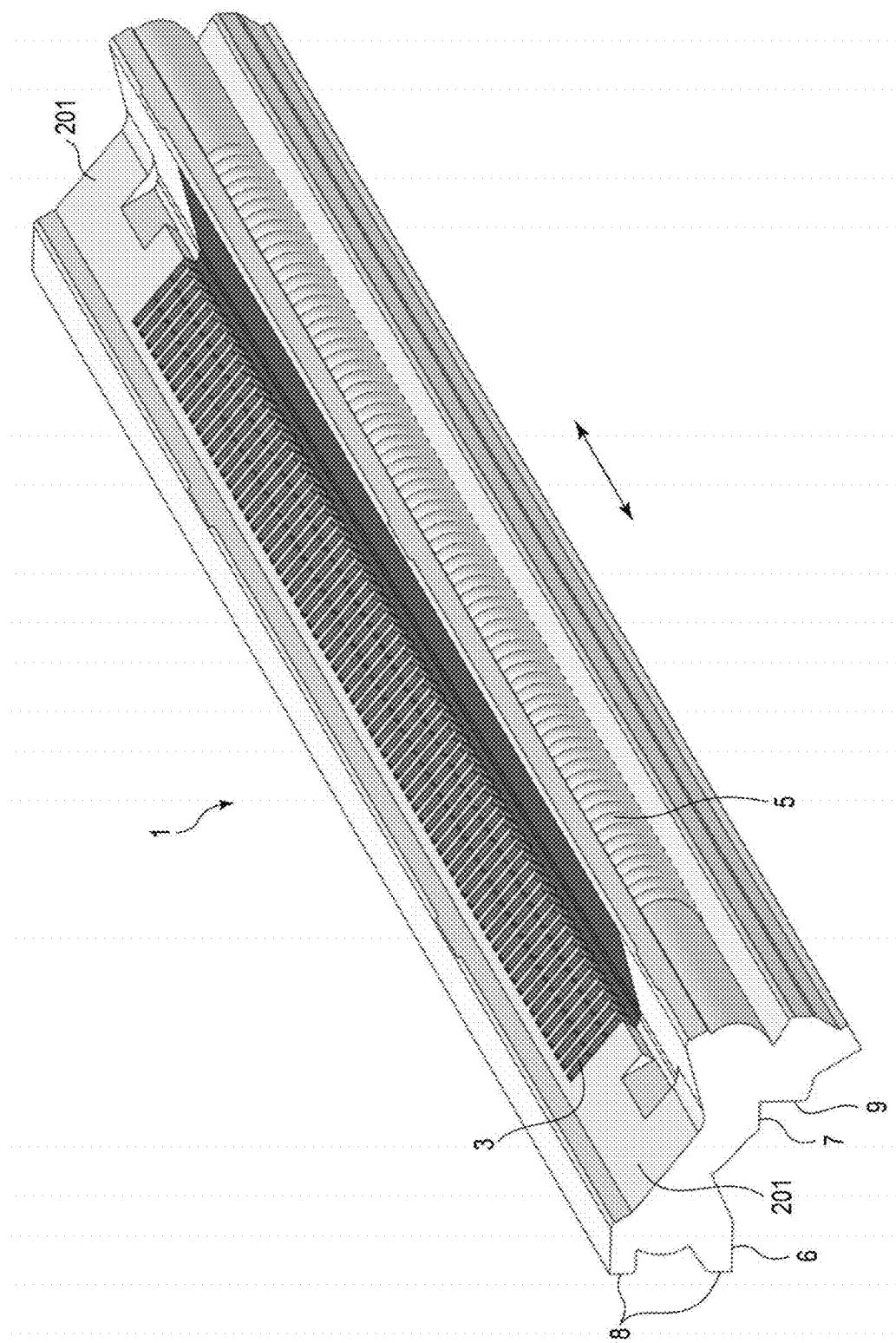
FIG. 5 is a perspective view of the lens mirror array illustrated in FIG. 4 viewed from an emission side of light.

As illustrated in FIGS. 4 and 5, the lens mirror array 1 has a long structure extending in a main scanning direction (an arrow direction). The lens mirror array 1 causes the image sensor 76 to form an erected image of an image on a document surface. Accordingly, the reading module 70 is moved in a sub-scanning direction indicated by an arrow illustrated in FIG. 1 along the document glass 82, whereby the entire image on the document surface can be read by the image sensor 76. The lens mirror array 1 is explained in detail below.

The image sensor 76 has a long structure extending in the main scanning direction. The image sensor 76 is a line sensor in which a plurality of imaging devices that convert light into an electric signal are linearly arrayed in the main scanning direction. The image sensor 76 is one or a plurality of line sensors. The image sensor 76 can be configured by, for example, a charge coupled device (CCD), a complementary metal oxide semiconductor (CMOS), or another imaging device.

Figure 7:
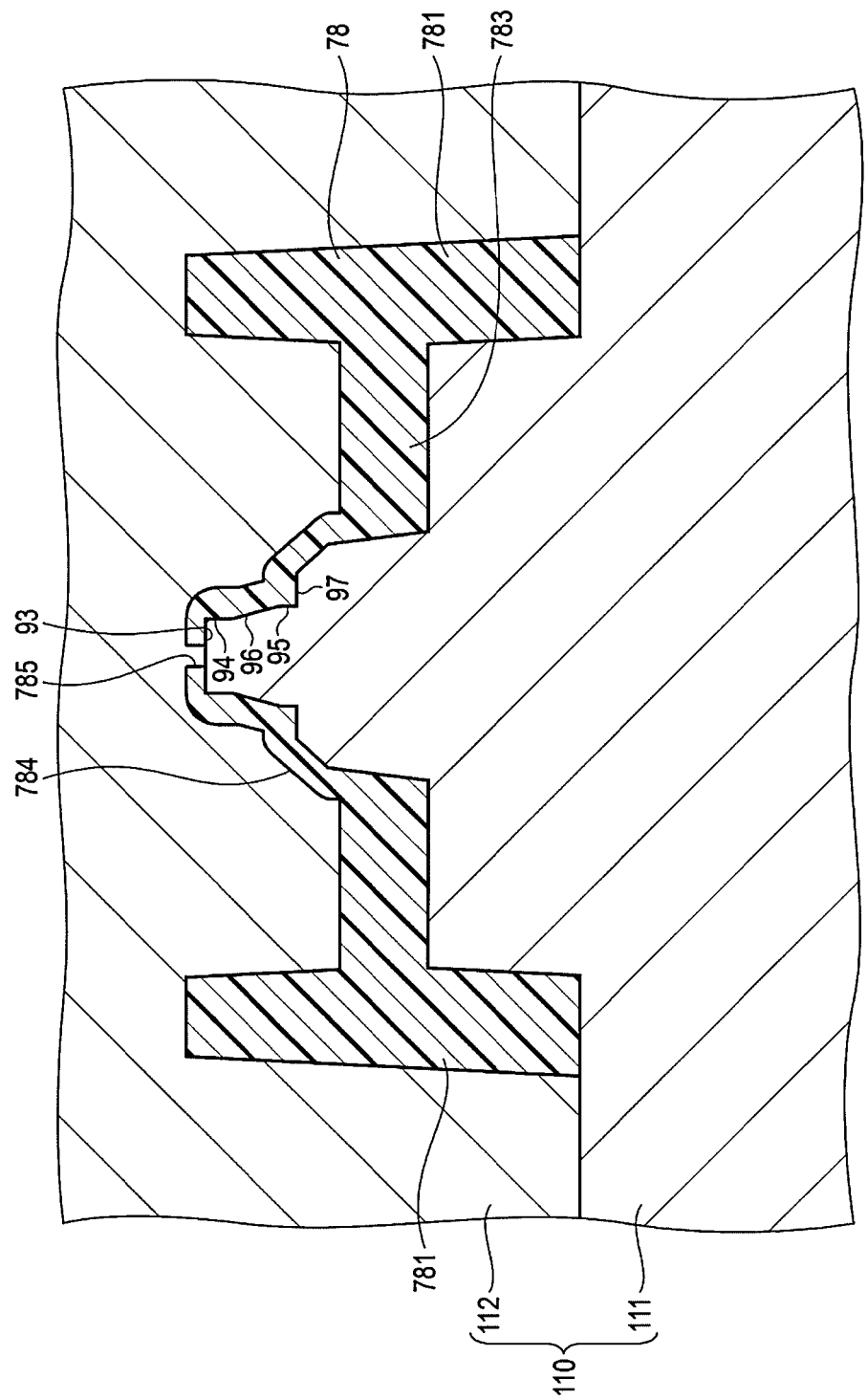
FIG. 7 is a sectional view illustrating a die for manufacturing the lens mirror array illustrated in FIG. 4.

The holder 78 has a long structure extending in the main scanning direction. The holder 78 can be formed by integral molding by resin using a die 110 (a male die 111 and a female die 112) illustrated in FIG. 7. The holder 78 includes a pair of sidewalls 781 disposed in the main scanning direction, a pair of end walls 782 (only the end wall 782 on the depth side is illustrated in FIG. 3) disposed at both ends in the longitudinal direction of the sidewalls 781, and a partition wall 783 connecting an inner surface in an intermediate part in the up-down direction of the pair of sidewalls 781 and an inner surface of an intermediate part in the up-down direction of the pair of end walls 782. An intermediate part in the sub-scanning direction (the left-right direction in FIG. 3) of the partition wall 783 forms a swelling portion 784 swelling upward. The swelling portion 784 has a long structure extending in the main scanning direction. Since the holder 78 is molded using the die 110, a draft taper needs to be provided on the surface of the holder 78.

Figure 6:
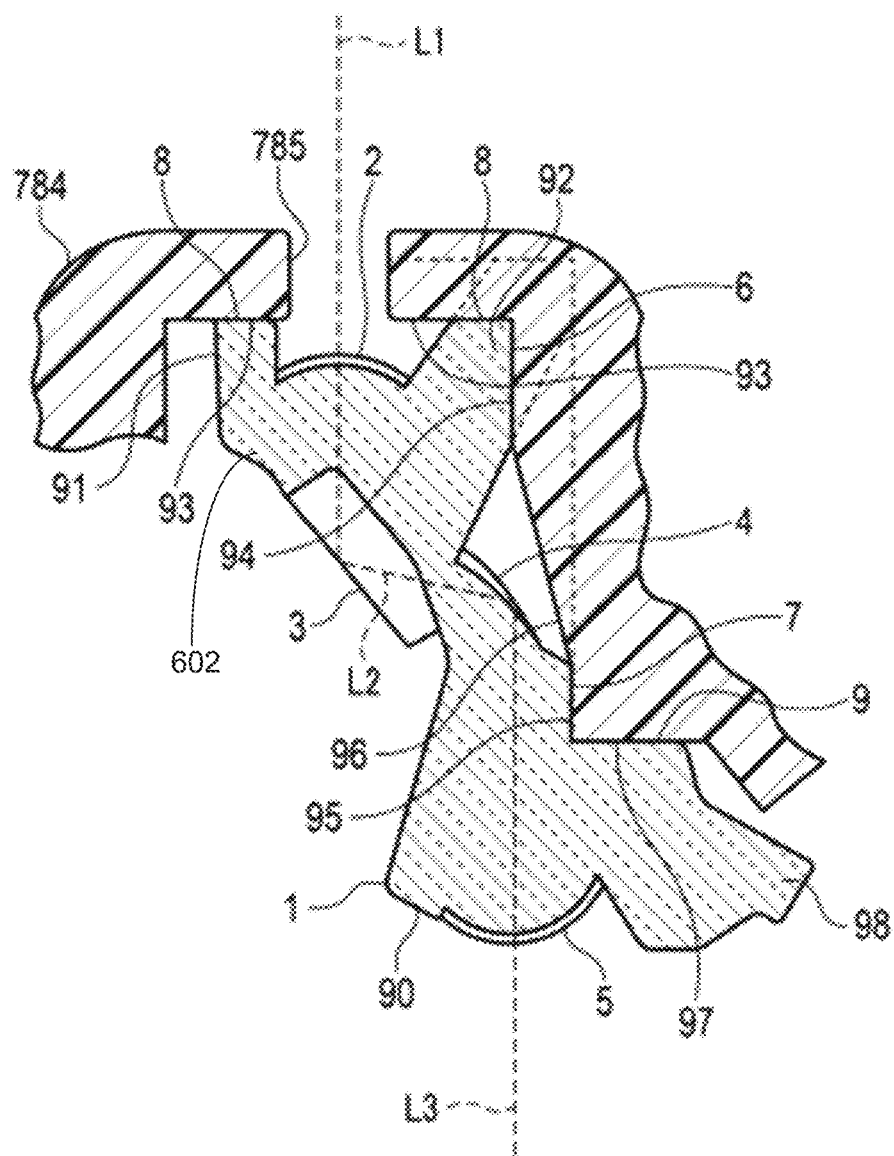
FIG. 6 is a sectional view illustrating the lens mirror array illustrated in FIG. 4 and an attachment structure for the lens mirror array.

As illustrated in FIG. 6, the swelling portion 784 of the holder 78 includes, substantially in the center in the sub-scanning direction, a rectangular slit-like aperture diaphragm 785 extending in the main scanning direction. The aperture diaphragm 785 allows reflected light reflected from the document surface to pass, narrows the width in the sub-scanning direction of the reflected light, and guides the reflected light to the lens mirror array 1. The holder 78 holds the lens mirror array 1 on the inner side of the swelling portion 784, that is, a lower side in FIG. 6 of the aperture diaphragm 785. Width in the sub-scanning direction and a disposition position in the sub-scanning direction of the aperture diaphragm 785 are substantially equivalent to width and a disposition position with which the reflected light from the document passed through the aperture diaphragm 785 is made incident on an incident-side lens surface 2 of the lens mirror array 1.

The holder 78 holds the reflection plates 72 and the light guide bodies 74 on the inner sides of the two sidewalls 781 and above the partition wall 783 on both sides across the swelling portion 784 in the sub-scanning direction. Illustration and explanation of a holding structure of the reflection plates 72 and the light guide bodies 74 are omitted.

The reflection plates 72 have, for example, a long rectangular plate shape extending in the main scanning direction. The reflection plates 72 include reflection surfaces opposed to not-illustrated light diffusing sections on which unevenness is provided or to which white ink is applied of the light guide bodies 74. The white ink is applied to or white resin is formed in a rectangular plate shape on the reflection surfaces of the reflection plates 72. The reflection plates 72 have a function of reflecting lights leaking from the light diffusing sections of the light guide bodies 74 to return the lights to the light guide bodies 74.

The light guide bodies 74 are, for example, substantially columnar transparent resin long in the main scanning direction and include, in a part of the surfaces of the light guide bodies 74, the light diffusing sections explained above in the longitudinal direction. The light guide bodies 74 guide lights emitted from not-illustrated LED light sources or the like disposed at one ends in the longitudinal direction of the light guide bodies 74. The reflection plates 72 reflect the lights leaking from the light diffusing sections of the light guide bodies 74 and return the lights to the light guide bodies 74.

Since the swelling portion 784 of the partition wall 783 of the holder 78 is present between the two light guide bodies 74, the two light guide bodies 74 need to be disposed to be separated a fixed distance from each other in the sub-scanning direction such that the swelling portion 784 does not form a shadow of illumination light. On the other hand, if the two light guide bodies 74 are separated in the sub-scanning direction, an angle of the illumination light irradiated on an image reading region on the document surface increases. A change in illuminance at the time when the distance between the document glass 82 and the document surface changes increases. Accordingly, the two light guide bodies 74 are desirably disposed close to each other in the sub-scanning direction as much as possible.

The holder 78 includes a plurality of bosses 786 projecting downward from a lower surface in FIG. 3 of the partition wall 783. The bosses 786 are provided on both the sides in the sub-scanning direction of the swelling portion 784 in three places of both the ends and the center in the sub-scanning direction of the partition wall 783. These six bosses 786 are respectively bosses for fixing the substrate 75 to the holder 78 using screws 787. Note that the holder 78 includes a plurality of bosses 788 for positioning the substrate 75 in the holder 78.

The lens mirror array 1 is explained below mainly with reference to FIG. 6. FIG. 6 is a sectional view of the lens mirror array 1 cut between two optical elements 90 adjacent to each other in the main scanning direction. As illustrated in FIGS. 4 and 5, the lens mirror array 1 has structure in which a plurality of transparent optical elements 90 having substantially the same shapes are integrally arrayed side by side in the main scanning direction. An effective surface of each of the optical elements 90 has a shape that is plane-symmetrical with respect to an imaginary center surface 602 passing the center in the main scanning direction and orthogonal to the main scanning direction.

The lens mirror array 1 includes, besides the plurality of optical elements 90, at both the ends in the longitudinal direction of the lens mirror array 1, extended portions 201 that the operator can touch when grasping the lens mirror array 1. The lens mirror array 1 in this embodiment is formed by integral molding of transparent resin. The lens mirror array 1 can also be formed by transparent glass.

Each of the optical elements 90 of the lens mirror array 1 guides diffused light emitted from an object point to form an image at an image forming point present on an image plane. One optical element 90 causes lights emitted from a plurality of object points arranged in the main scanning direction to form images on the image plane. For example, the one optical element 90 causes light emitted from an object point arranged within width twice or three times as large as a pitch in the main scanning direction of the optical elements 90 to form an images on the image plane. Each of the optical elements 90 of the lens mirror array 1 reflects incident light twice and emits the light to form an erected image of the object point at an image forming point.

Each of the optical elements 90 of the lens mirror array 1 includes, on the surface of the optical element 90, an incident-side lens surface 2, an upstream-side reflection surface 3 (a first reflection surface), a downstream-side reflection surface 4 (a second reflection surface), an emission-side lens surface 5, a first positioning surface 6, a second positioning surface 7, and third positioning surfaces 8 and 9. The incident-side lens surface 2, the downstream-side reflection surface 4, and the emission-side lens surface 5 are free curved surfaces convex to the outer side. The upstream-side reflection surface 3 is a flat surface. The other surfaces of the plurality of optical elements 90 respectively configure one flat surface connected in the main scanning direction over the entire length of the lens mirror array 1.

The incident-side lens surface 2 of the optical element 90 is opposed to the aperture diaphragm 785 present in the swelling portion 784 of the holder 78. The incident-side lens surface 2 refracts and converges reflected light (incident light) reflected on the document surface and passed through the aperture diaphragm 785.

The optical element 90 includes projecting portions 91 and 92 projecting upward in FIG. 6 on both the sides in the sub-scanning direction of the incident-side lens surface 2. The projecting portion 91 continuous to the left side in FIG. 6 of the incident-side lens surface 2 includes the third positioning surface 8 at the upper end of the projecting portion 91. The projecting portion 92 continuous to the right side in FIG. 6 of the incident-side lens surface 2 includes the third positioning surface 8 at the upper end of the projecting portion 92. The third positioning surface 8 of the projecting portion 91 and the third positioning surface 8 of the projecting portion 92 may be disposed on the same plane. The third positioning surfaces 8 of the plurality of optical elements 90 are flat surfaces horizontally connected in the main scanning direction and are in surface contact with third contact surfaces 93 present on lower surfaces of portions on both the sides in the sub-scanning direction of the aperture diaphragm 785 of the swelling portion 784 of the holder 78. Consequently, the holder 78 positions the lens mirror array 1 in the up-down direction.

If all the surfaces are used for the positioning, since there are three surfaces for the positioning in the up-down direction, actually, the lens mirror array 1 is positioned by a surface defined at the bottom. In particular, if there is one surface desired to be used for the positioning, the surfaces other than the one surface can also be used for bonding to the holder 78 without being set in contact with the holder 78. Rather than positioning the lens mirror array 1 with the entire surfaces, it is also effective to form low protrusions in a part of the positioning surfaces for the lens mirror array 1 or the holder 78.

The projecting portion 92 on the right side in FIG. 6 of the optical element 90 includes the first positioning surface 6 substantially orthogonal to the third positioning surface 8. The first positioning surface 6 is a surface orthogonal to an imaginary center surface 602 including an optical axis L1 of incident light made incident via the incident-side lens surface 2 and an optical axis L2 of reflected light reflected by the upstream-side reflection surface 3 and is a surface disposed in parallel to the optical axis L1 in a position separated from the optical axis L1 to a reflecting side of the incident light by the upstream-side reflection surface 3. The first positioning surface 6 present on a side surface of the projecting portion 92 is in surface contact with a first contact surface 94 present on a left surface in FIG. 6 of a portion on the right side in FIG. 6 of the aperture diaphragm 785 of the swelling portion 784 of the holder 78. Consequently, the holder 78 positions the incident-side lens surface 2 of the lens mirror array 1 in the sub-scanning direction.

The upstream-side reflection surface 3 is adjacent to the opposite side of the projecting portion 91 with respect to the incident-side lens surface 2. The upstream-side reflection surface 3 is present further downward in FIG. 6 than the first positioning surface 6 along the optical axis L1. In other words, the first positioning surface 6 is present further on the incident-side lens surface 2 side than the upstream-side reflection surface 3 along the optical axis L1. The upstream-side reflection surface 3 totally reflects light made incident via the incident-side lens surface 2 toward the downstream-side reflection surface 4. A direction in which the upstream-side reflection surface 3 reflects the incident light is a direction toward the right side in FIG. 6 with respect to the optical axis L1 of the incident light.

The downstream-side reflection surface 4 is continuous to the opposite side of the projecting portion 92 with respect to the incident-side lens surface 2. The downstream-side reflection surface 4 is present above the emission-side lens surface 5 in FIG. 6 along an optical axis L3 of emission light emitted via the emission-side lens surface 5. The downstream-side reflection surface 4 totally reflects light reflected by the upstream-side reflection surface 3 toward the emission-side lens surface 5. A direction in which the downstream-side reflection surface 4 reflects the light is a downward direction in FIG. 6 and is a direction overlapping an optical axis L of the emission light. The optical axis L3 of the emission light is separated from the optical axis L1 of the incident light to a reflecting side of light by the upstream-side reflection surface 3 and is parallel to the optical axis L1 of the incident light.

The lens mirror array 1 includes the second positioning surface 7 continuous to an end side on a side separated from the projecting portion 92 of the downstream-side reflection surface 4. The second positioning surface 7 is a surface parallel to the first positioning surface 6 and is present in a position further separated to the right side in FIG. 6 from the optical axis L1 than the first positioning surface 6. The second positioning surface 7 is present on the opposite side (the right side in FIG. 6) of the optical axis L1 of the incident light with respect to the optical axis L3 of the emission light. The second positioning surface 7 is present further on the emission-side lens surface 5 side than the first positioning surface 6 along the optical axis L3 and is present further on the emission-side lens surface 5 side than the downstream-side reflection surface 4.

The holder 78 includes a second contact surface 95 that is in surface contact with the second positioning surface 7 of the lens mirror array 1. The second contact surface 95 is a surface parallel to the first contact surface 94. The holder 78 positions the emission-side lens surface 5 of the lens mirror array 1 in the sub-scanning direction.

Since the first positioning surface 6 and the second positioning surface 7 of the lens mirror array 1 deviate in the sub-scanning direction, the first contact surface 94 and the second contact surface 95 of the holder 78 also deviate in the sub-scanning direction. Accordingly, the holder 78 includes a taper surface 96 between the first contact surface 94 and the second contact surface 95. The taper surface 96 functions as a draft taper at the time when the holder 78 is released from the die 110.

The lens mirror array 1 includes the third positioning surface 9 continuously to an end side on the opposite side of the downstream-side reflection surface 4 of the second positioning surface 7. The third positioning surface 9 is a substantially horizontal and flat surface and is in surface contact with a third contact surface 97 of the holder 78. Consequently, the holder 78 positions the lens mirror array 1 in the up-down direction. The lens mirror array 1 includes a flange section 98 projecting to the outer side between the third positioning surface 9 and the emission-side lens surface 5.

Incidentally, an imaginary boundary surface (a cross section of FIG. 6) between the two optical elements 90 adjacent to each other in the main scanning direction is a surface orthogonal to the main scanning direction and is a surface generally orthogonal to the surfaces 2, 3, 4, 5, 6, 7, 8, and 9 of the optical element 90. The surfaces 2, 3, 4, 5, 6, 7, 8, and 9 of the optical element 90 are surfaces generally extending in the longitudinal direction of the lens mirror array 1. That is, in the lens mirror array 1 obtained by integrally connecting the plurality of optical elements 90 in the main scanning direction, the surfaces 2, 3, 4, 5, 6, 7, 8, and 9 of the optical element 90 are respectively continuous surfaces connected in the main scanning direction.

Functions of the lens mirror arrays 1 explained above are explained below. The lens mirror array 1 is attached to the holder 78 by, for example, bonding with the first positioning surface 6 set in contact with the first contact surface 94 of the holder 78, the second positioning surface 7 set in contact with the second contact surface 95 of the holder 78, the third positioning surfaces 8 set in contact with the third contact surfaces 93 of the holder 78, and the third positioning surface 9 set in contact with the third contact surface 97 of the holder 78.

Light reflected on a document surface is made incident on the incident-side lens surfaces 2 of the plurality of optical elements 90. That is, reflected light from the document surface placed at an object point is made incident on the incident-side lens surface 2. The incident-side lens surface 2 refracts and converges the incident light and forms an intermediate inverted image.

The upstream-side reflection surface 3 reflects the incident light made incident via the incident-side lens surface 2 toward the downstream-side reflection surface 4. The downstream-side reflection surface 4 further reflects the light reflected by the upstream-side reflection surface 3 toward the emission-side lens surface 5. The downstream-side reflection surface 4 may be formed by a flat surface.

The emission-side lens surface 5 emits the light reflected by the downstream-side reflection surface 4 toward the image sensor 76 disposed at an image forming point. The emission-side lens surface 5 forms an erected image, which is an inverted image of the intermediate inverted image formed by the incident-side lens surface 2, in cooperation with the downstream-side reflection surface 4. Emission light emitted from the emission-side lens surface 5 forms an image on a light receiving surface of the image sensor 76 disposed at the image forming point.

As explained above, according to this embodiment, each of the optical elements 90 of the lens mirror array 1 includes the first positioning surface 6 parallel to the optical axis L1 in the position separated from the optical axis L1 of the incident light in the reflecting direction of the light by the upstream-side reflection surface 3 and includes the second positioning surface 7 in the position further on the emission-side lens surface 5 side than the first positioning surface 6 along the optical axis L1 and further separated from the optical axis L1 than the first positioning surface 6. Accordingly, if the lens mirror array 1 in this embodiment is used, the holder 78 made of resin can be used.

That is, if the lens mirror array 1 in this embodiment is used, the first contact surface 94 of the holder 78 in contact with the first positioning surface 6 of the optical element 90 and the second contact surface 95 in contact with the second positioning surface 7 of the optical element 90 do not need to be disposed on the same plane. Therefore, it is easy to provide, in the holder 78, a draft taper for releasing the holder 78 from the die 110. For example, the first positioning surface 6 and the second positioning surface 7 of the optical element 90 are provided at different distances from the optical axis L1. Therefore, the taper surface 96 can be provided between the first contact surface 94 and the second contact surface 95 of the holder 78. The holder 78 can be released from the die 110.

If the first positioning surface 6 and the second positioning surface 7 are disposed at the different distances from the optical axis L1 as in the lens mirror array 1 in this embodiment, it is unnecessary to dispose the first contact surface 94 and the second contact surface 95 of the holder 78 on the same plane. Therefore, it is possible to improve shapes and position accuracy of the first and second contact surfaces 94 and 95. That is, even if the first and second contact surfaces 94 and 95 are formed on a surface parallel to the optical axis L1, the holder 78 can be released from the die 110. In contrast, if the first and second contact surfaces 94 and 95 are disposed on the same plane, a draft taper cannot be provided in the portions of the first and second contact surfaces 94 and 95. It may be difficult to release the holder 78 from the die 110.

If it is attempted to dispose the first positioning surface 6 on the same plane as the second positioning surface 7 as indicated by a broken line in FIG. 6 as in the lens mirror array of the related art attached to a holder made of sheet metal, the projecting portion 92 of the optical element 90 needs to be extended to a farther position from the optical axis L1. In this case, the width in the sub-scanning direction of the end portion on the incident side of the optical element 90 increases. It is necessary to expand the width in the sub-scanning direction of the swelling portion 784 of the holder 78. If the width in the sub-scanning direction of the swelling portion 784 is expanded, the distance between the two light guide bodies 74 disposed on both the sides in the sub-scanning direction increases. That is, in this case, an angle of illumination light irradiated on the image reading region of the document surface increases. Illuminance easily changes if the distance between the document surface and the document glass 82 fluctuates.

That is, by disposing the first positioning surface 6 of the optical element 90 closer to the optical axis L1 than the second positioning surface 7 of the optical element 90 as in this embodiment, it is possible to reduce the width of the end portion on the incident side of the optical element 90, reduce the distance between the two light guide bodies 74, and suppress a change in illuminance at the time when the document surface is separated from the document glass 82. Consequently, it is possible to reduce the width in the sub-scanning direction of the swelling portion 784 of the holder 78 and compactly configure the reading module 70.

From another perspective, in the lens mirror array 1 in this embodiment, the second positioning surface 7 is present in the position further separated from the optical axis L1 of the incident light than the first positioning surface 6 and the second positioning surface 7 is present on the opposite side of the optical axis L1 of the incident light with respect to the optical axis L3 of the emission light. Accordingly, it is possible to increase a cross section orthogonal to the optical axis L3 in the part of the optical element 90 that guides light reflected by the downstream-side reflection surface 4 toward the emission-side lens surface 5. A resin material such as the lens mirror array in this embodiment has a characteristic that a refractive index of light is higher in a part close to the surface of the resin material than in the center of the resin material. Accordingly, by increasing a sectional area of a part where the emission light passes, it is possible to prevent light reflected by the downstream-side reflection surface 4 and traveling toward the emission-side lens surface 5 from passing near the surface of the optical element 90. It is possible to prevent the optical element 90 from being easily affected by a difference in a refractive index.

By forming the holder 78 with the integral molding of resin as in this embodiment, it is possible to simultaneously form the aperture diaphragm 785 in the holder 78. It is possible to improve relative position accuracy of the aperture diaphragm 785 with respect to the lens mirror array 1.

While certain embodiment have been described, this embodiment has been presented by way of example only, and is not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A lens mirror array comprising a plurality of optical elements, each optical element having an optical axis of incident light thereon, the plurality of optical elements being arrayed in a direction orthogonal to the optical axes and parallel to a first positioning surface, each optical element comprising:
   an incident-side lens surface that refracts and converges incident light;
   a first reflection surface that reflects light made incident via the incident-side lens surface;
   a second reflection surface that reflects the light reflected by the first reflection surface;
   an emission-side lens surface that emits the light reflected by the second reflection surface;
   wherein each optical element includes a center plane including the respective optical axis of incident light and an optical axis of the reflected light reflected by the first reflection surface, and the first positioning surface is orthogonal to the center plane,
   wherein the first positioning surface is disposed in parallel to the optical axis of the incident light in a position separated from the optical axis of the incident light by the first reflection surface; and
   a second positioning surface in a position that is further on a side of the lens mirror array of the emission-side lens surface than the first positioning surface along the optical axis of the incident light and is further separated from the optical axis of the incident light by the first reflection surface than the first positioning surface,
   wherein in the center plane, a primary third positioning surface continuously extends in a direction from the second positioning surface, and extends in a right second direction opposite to a secondary third positioning surface that continuously extends in a first direction from the first positioning surface on a side, in the second direction, of the optical axis of the incident light, and
   wherein the primary third positioning surface and the secondary third positioning surface are disposed on the side, in the second direction, of the optical axis of the incident light in the center plane.

2. The lens mirror array according to claim 1, wherein the second positioning surface is parallel to the first positioning surface.

3. The lens mirror array according to claim 2, wherein
   the first positioning surface is further on the incident-side lens surface side than the first reflection surface along the optical axes, and
   the second positioning surface is further on the emission-side lens surface than the second reflection surface along the optical axes.

4. The lens mirror array according to claim 1, wherein an optical axis of emission light emitted from the emission-side lens surface is separated from the optical axis of the incident light by the first reflection surface and is parallel to the optical axis of the incident light.

5. The lens mirror array according to claim 4, wherein the second positioning surface is on an opposite side of the optical axis of the incident light with respect to the optical axis of the emission light.

6. The lens mirror array according to claim 1, wherein the primary third positioning surface or the secondary third positioning surface is orthogonal to the optical axis of the incident light.

7. An optical device, comprising:
   the lens mirror array according to claim 1 configured to guide reflected light reflected from a document surface; and
   a holder including a first contact surface in surface contact with the first positioning surface and a second contact surface in surface contact with the second positioning surface, the holder holding the lens mirror array.

8. The optical device according to claim 7, wherein the holder includes an aperture diaphragm that is, in a state in which the lens mirror array is positioned and attached to the holder, opposed to the incident-side lens surfaces of the plurality of optical elements and allows the incident light to pass toward the incident-side lens surface.

9. The optical device according to claim 7, wherein the second positioning surface is parallel to the first positioning surface.

10. The optical device according to claim 9, wherein
    the first positioning surface is further on the incident-side lens surface side than the first reflection surface along the optical axes, and
    the second positioning surface is further on the emission-side lens surface than the second reflection surface along the optical axes.

11. An optical device, comprising:
    the lens mirror array according to claim 6 configured to guide reflected light reflected from a document surface; and
    a holder including a first contact surface that is in surface contact with the first positioning surface, a second contact surface in surface contact with the second positioning surface, and a third contact surface that is in surface contact with the third positioning surface, the holder holding the lens mirror array.

12. The optical device according to claim 9, wherein the holder includes an aperture diaphragm that is, in a state in which the lens mirror array is positioned and attached to the holder, opposed to the incident-side lens surfaces of the plurality of optical elements and allows the incident light to pass toward the incident-side lens surface.

13. The optical device according to claim 11, wherein the second positioning surface is parallel to the first positioning surface.

14. An image forming apparatus, comprising:
a lens mirror array configured to guide reflected light reflected from a document surface;
a photoelectric conversion component configured to receive the reflected light reflected from the document surface and guided via the lens mirror array and output an image signal; and
an image forming component configured to form an image based on the image signal output from the photoelectric conversion component,
wherein the lens mirror array comprises a plurality of optical elements, the optical elements having optical axes of incident light thereon, the plurality of optical elements being arrayed in a direction orthogonal to the optical axes and parallel to a first positioning surface, each optical element comprising:
an incident-side lens surface that refracts and converges incident light;
a first reflection surface that reflects light made incident via the incident-side lens surface;
a second reflection surface that reflects the light reflected by the first reflection surface;
an emission-side lens surface that emits the light reflected by the second reflection surface;
wherein each optical element comprises a center plane comprising the optical axis of incident light and an optical axis of the reflected light reflected by the first reflection surface, and the first positioning surface is orthogonal to the center plane,
wherein the first positioning surface is disposed in parallel to the optical axis of the incident light in a position separated from the optical axis of the incident light by the first reflection surface; and
a second positioning surface in a position that is further on a side of the lens mirror array of the emission-side lens surface than the first positioning surface along the optical axis of the incident light and is further separated from the optical axis of the incident light by the first reflection surface than the first positioning surface,
wherein in the center plane, a primary third positioning surface continuously extends in a direction from the second positioning surface, and extends in a second direction opposite to a secondary third positioning surface that continuously extends in a first direction from the first positioning surface on a side, in the second direction, of the optical axis of the incident light, and
wherein the primary third positioning surface and the secondary third positioning surface are disposed on the side, in the second direction, of the optical axis of the incident light in the center plane.

15. The image forming apparatus according to claim 14, wherein the image forming apparatus is a scanner.

16. The image forming apparatus according to claim 14, wherein the second positioning surface is parallel to the first positioning surface.

17. The image forming apparatus according to claim 16, wherein
the first positioning surface is further on the incident-side lens surface side than the first reflection surface along the optical axes, and
the second positioning surface is further on the emission-side lens surface than the second reflection surface along the optical axes.

18. The image forming apparatus according to claim 14, wherein an optical axis of emission light emitted from the emission-side lens surface is separated from the optical axis of the incident light by the first reflection surface and is parallel to the optical axis of the incident light.

19. The image forming apparatus according to claim 18, wherein the second positioning surface is on an opposite side of the optical axis of the incident light with respect to the optical axis of the emission light.

20. The image forming apparatus according to claim 14, wherein the primary third positioning surface or the secondary third positioning surface is orthogonal to the optical axis of the incident light.

* * * * *